(12) United States Patent
Gee

(10) Patent No.: US 6,845,992 B1
(45) Date of Patent: Jan. 25, 2005

(54) CONTAINER MOVING APPARATUS

(76) Inventor: Graham Gee, 112 Corporation St., Chorley, Lancashire PR6 0DN (GB)

( * ) Notice: Subject to any disclaimer, the term of this patent is extended or adjusted under 35 U.S.C. 154(b) by 0 days.

(21) Appl. No.: 10/049,354

(22) PCT Filed: Aug. 18, 2000

(86) PCT No.: PCT/GB00/03195

§ 371 (c)(1),
(2), (4) Date: May 1, 2002

(87) PCT Pub. No.: WO01/12491

PCT Pub. Date: Feb. 22, 2001

(30) Foreign Application Priority Data

Aug. 18, 1999 (GB) ............................................. 9919420

(51) Int. Cl.[7] .............................................. B62B 1/00
(52) U.S. Cl. .................... 280/47.3; 280/47.32; 280/836
(58) Field of Search ............................ 280/47.3, 47.29, 280/47.33, 47.34, 47.26, 47.35, 47.36, 47.371, 47.41, 42, 79.5, 79.6, 646, 641, 651, 79.4, 78, 836, 834, 835, 837, 838, 839; 239/146, 147; 111/118, 123, 128; 299/29; 162/425, 422

(56) References Cited

U.S. PATENT DOCUMENTS

| | | | | | |
|---|---|---|---|---|---|
| 6,826 | A | * | 10/1849 | Furley | 280/836 |
| 140,043 | A | * | 6/1873 | Howard | 280/836 |
| 581,416 | A | * | 4/1897 | Dunn | 280/836 |
| 1,016,381 | A | * | 2/1912 | Watson | 280/659 |
| 2,412,697 | A | | 12/1946 | Sochaczewski | |
| 2,413,280 | A | * | 12/1946 | Ashenden | 180/20 |
| 2,503,314 | A | * | 4/1950 | Atwood | 280/659 |
| 2,548,190 | A | * | 4/1951 | Arpin, Jr. | 280/836 |
| 2,651,973 | A | * | 9/1953 | Elliott | 280/836 |
| 2,716,557 | A | * | 8/1955 | Gould et al. | 280/659 |
| 2,893,746 | A | * | 7/1959 | Cunningham | 280/836 |
| 2,952,468 | A | * | 9/1960 | Albee | 280/836 |
| 2,967,058 | A | * | 1/1961 | Hoffmann, Jr. | 280/30 |
| 2,974,970 | A | * | 3/1961 | Tuttle et al. | 280/836 |
| 3,054,622 | A | * | 9/1962 | Davis et al. | 280/645 |
| 3,059,942 | A | * | 10/1962 | Kirk et al. | 280/836 |
| 3,102,972 | A | * | 9/1963 | Andresen | 280/836 |
| 3,216,735 | A | * | 11/1965 | Larson et al. | 280/836 |
| 3,264,007 | A | * | 8/1966 | Rill et al. | 280/836 |
| 3,718,342 | A | | 2/1973 | Freed | |
| 4,218,015 | A | * | 8/1980 | Dean | 280/836 |
| 4,815,761 | A | * | 3/1989 | Henderson et al. | 280/47.3 |

FOREIGN PATENT DOCUMENTS

| | | | | |
|---|---|---|---|---|
| DE | 4132646 A1 | * | 4/1993 | ............. B62B/5/00 |
| FR | 995 125 A | | 11/1951 | |

* cited by examiner

*Primary Examiner*—Hau Phan
(74) *Attorney, Agent, or Firm*—Kohn & Associates, PLLC

(57) ABSTRACT

Container moving apparatus (10) including a frame having two side members (12, 14), which are connected at an upper location by a handle section (16). Each side member has a clamping member (20, 22) secured at a lower position. The clamping members (20, 22) are secured to the side members (12, 14) through roller bearings (24, 26) in order for the clamping members (20, 22) to rotate relative to the side members (12, 14). The clamping members (20, 22) are arranged to clamp a container (32) therebetween in order for the container (32) to be rolled along a surface under the control of the handle section (10). The clamping members (20, 22) can be moved apart in order to release the container (32) and move towards each other in order to claim the container (32).

23 Claims, 4 Drawing Sheets

CONTAINER MOVING APPARATUS

CROSS-REFERENCE TO RELATED APPLICATIONS

This patent application is a National Phase Concerning a Filing Under 35 U.S.C. 371, claiming the benefit of priority of PCT/GB00/03195, filed Aug. 18, 2000, which claims the benefit of priority of Great Britain Application Serial No. 9919420.1, filed Aug. 18, 1999, all of which are incorporated herein by reference.

FIELD OF THE INVENTION

The invention relates to container moving apparatus and especially, but not limited to, apparatus for moving containers containing fluids, for example beer barrels or gas cylinders.

BACKGROUND TO THE INVENTION

Containers containing fluids, for example beer barrels, gas cylinders, chemical drums, oil drums and fluid filled plastic containers are heavy and difficult to move. This is especially apparent for containers having a volume of 5 gallons and upwards. The barrels can simply be pushed and rolled along the ground. However, with these methods the barrels are generally out of control if being pushed down a decline and are therefore dangerous. In addition, the barrels are difficult to push up an incline and are also at risk of rolling back down the incline. Furthermore, if the barrels are manually manoeuvred then this requires the person to bend over in order to push the barrels. This puts the person at risk from injury and puts a high strain on the back of the individual. Any resultant back pain can result in time off work for the individual, and, therefore, puts a burden on the employer.

A prior art method comprises a trolley having a support section located between two wheels and a handle. The barrel is placed on the support section and the support section is tilted using the handle and the barrel an then be manoeuvred. One problem with such trolleys is that the wheels are generally small which makes the trolley difficult to manoeuvre upstairs or downstairs. In addition, the barrel is at risk of falling off the support section when manoeuvring down a decline or downstairs. With such trolleys the barrel travels in front of the individual. At sharp corners there is a risk of a collision since the individual cannot see around the corner prior to the barrel being pushed in front of the corner. The only solution is for the individual to stop pushing the trolley and firstly check for hazards around the corner.

It is an aim of the present invention to overcome at least one problem associated with the prior art whether referred to herein or otherwise.

SUMMARY OF THE INVENTION

According to a first aspect of the present invention there is provided apparatus for moving a container, the apparatus comprising a frame, the frame comprising a handle section, the frame being arrangeable, in use, to be secured to the container such that the container can rotate relative to the frame and the container can be rolled along a surface, movement of the container being controlled by the handle section.

According to a second aspect of the present invention there is provided an assembly comprising apparatus for moving a container in accordance with the first aspect of the present invention secured to a container.

Preferably the cross section of the container is substantially circular. The container may be substantially cylindrical. The container may be a fluid filled container. The container may be a barrel and may be a beer barrel. The container may be a cylinder and may be a gas cylinder. The container may be a chemical drum or an oil drum. The container may be a plastics container. The container may be arranged to contain greater than 3 gallons and preferably greater than 5 gallons of a fluid. The container may be arranged to contain substantially 9 or 10 or 11 or 18 or 22 gallons of a fluid.

The frame may be arranged, in use, to be secured to the container such that the container can rotate relative to the frame and the container can be rolled along a surface or the ground preferably by manually pulling or pushing the frame.

Preferably the frame is arranged to clamp the container.

Preferably the frame has a first clamping member and a second clamping member. Preferably the first and second clamping members can be moved towards each other between at least a first and second position. Preferably the clamping members are locked in the first position. Preferably the clamping members are locked in the second position. In the first position the clamping members may be spaced apart by a distance greater than the length of the container. In the second position the clamping embers may be spaced apart by a distance substantially the same as the length of the container. Preferably the container is clamped in the second position.

The first and second clamping members may be plates. The clamping members may have projections located thereon. Each clamping member may have a plurality of projections located thereon and preferably four or five projections located thereon. The projections on the first clamping member may project towards the projections on the second clamping member. The projections on at least one of the clamping members may be radially spaced to enable a spear of a beer barrel to be located therebetween. The projections on one clamping member may be longer than the projections on the other clamping member. The projections may be radially located on each clamping member. The projections may comprise a point at the end. The projections may be rounded or flat at the end. The projections may comprise a metal and may comprise hardened steel.

One or each clamping member may have a reinforcement plate spaced from the clamping member. Preferably the or each reinforcement plate reinforces the projections.

The clamping member may comprise conical members. The conical members may comprise a plastics material. The clamping members may comprise material for improving the grip of the container. The material may comprise rubber. The clamping member may comprise rubber discs or rubber annular members.

The frame may comprise a metal and preferably is substantially aluminium. The length of the frame may be adjustable. The width of the frame may be adjustable.

The frame may comprise first and second side members. The handle may be connected between the first and second side members. The first and second side members may be connected by a reinforcement member. The length of the reinforcement member may be adjustable. The distance between the first and second side members may be adjustable. The first and second side members may support the first and second clamping members respectively. Preferably the first and second clamping members are rotatably connected to the first and second side members. Preferably the first and second clamping members are secured to the first and second side members through a bearing and preferably through a rolling bearing which may be a three dimensional bearing.

Preferably the plates of the first and second clamping members can pivot relative to the side members.

Preferably adjustment means are located between the first and second side members. Preferably the means adjusts the distance between the first and second side members. The means may comprise a flexible member which is secured between the first and second side members. Preferably the length of the flexible member may be adjusted. The flexible member may comprise a length of webbing. The means may comprise a ratchet mechanism or a clamping mechanism.

The adjustment means may comprise a clamping mechanism.

The apparatus may have a brake mechanism. The brake mechanism may inhibit or prevent rotation of the container relative to the frame.

According to a third aspect of the present invention there is provided a method of moving a container, the method comprising the steps of fixing a frame to a container such that the container can rotate relative to the frame and moving the frame such that the container rotates relative to the frame and the container rolls along a surface.

The method may comprise pushing the frame. Preferably the method comprises pulling the frame. Preferably the method is a manual method of moving the container.

Preferably the method comprises clamping the container in the frame. Preferably the method comprises clamping the container between first and second clamping members. Preferably the method comprises clamping the container between projections on the first and second clamping members.

Preferably the method comprises clamping the ends of the container between the clamping members.

The method may comprise moving first and second clamping members between a first and second position to clamp the container. The method may comprise operating a ratchet mechanism to move first and second clamping members. The method may comprise operating a clamp to move first and second clamping members.

BRIEF DESCRIPTION OF THE DRAWINGS

The present invention will now be described, by way of example only, with reference to the drawings that follow, in which.

DESCRIPTION OF THE PREFERRED EMBODIMENTS

Figures 1, 2:
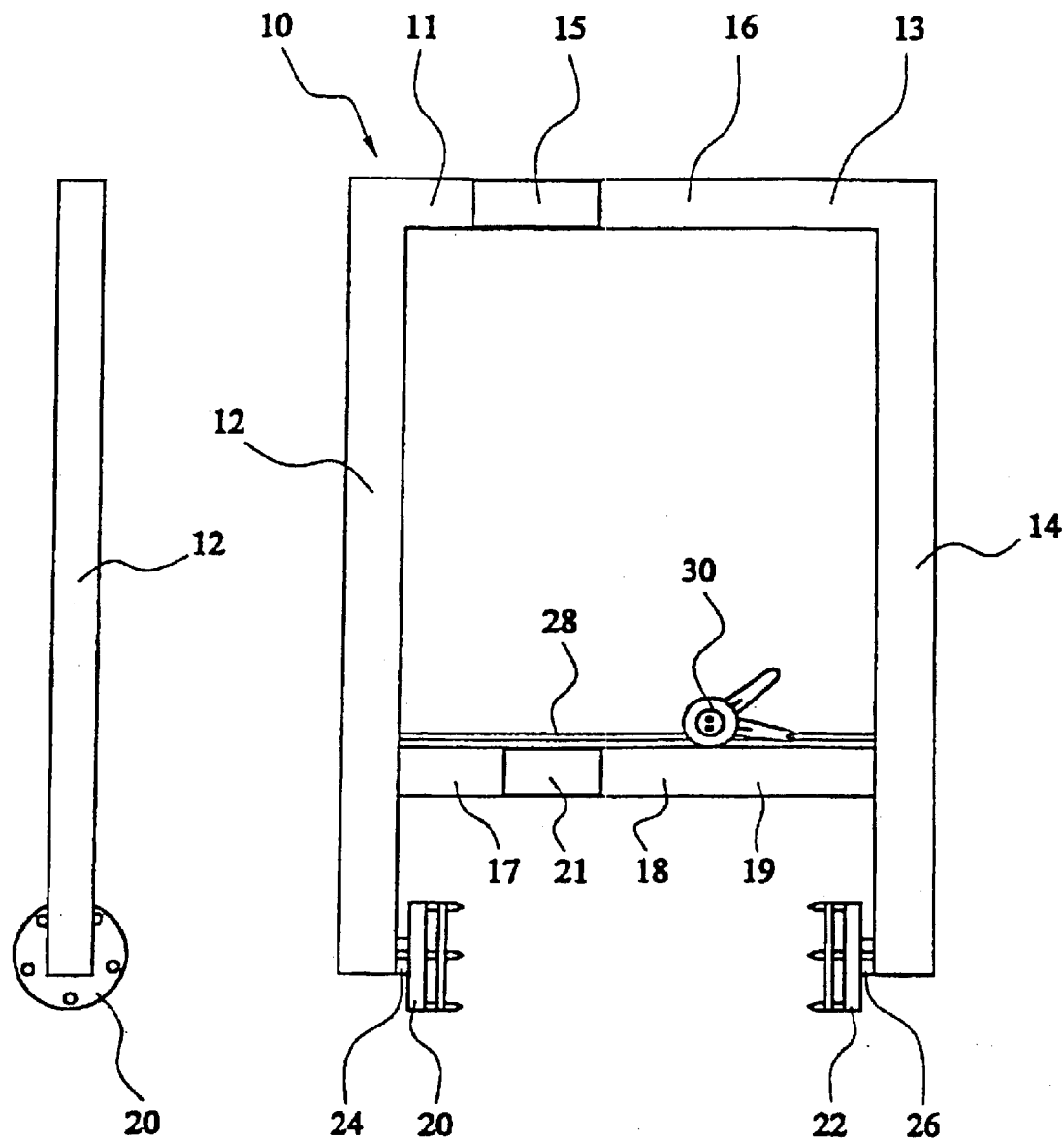
FIG. 1 is a front view of one embodiment of beer barrel moving apparatus according to the invention.
FIG. 2 is a side view of the beer barrel moving apparatus.

As shown in FIGS. 1 and 2, beer barrel moving apparatus 10 has a frame comprising two side members 12, 14 which are connected at an upper location by a handle section 16. The side members 12, 14 are connected at a lower position by a reinforcement member 18.

The side members 12 and 14, handle section 16 and reinforcement member 18 all comprise tubular or box sections of aluminium. The handle section 16 and the reinforcement member 18 are both telescopic. The handle section 16 has two outer tube sections 11, 13 each being connected to one side member 12, 14 respectively. An inner tube section 15 having a smaller cross section is located inside the two outer sections 11, 13. Similarly, the reinforcement member 18 has two outer tube sections 17, 19 each being connected to one side member 12, 14 respectively. An inner tube section 21 having a smaller cross section is located inside the two outer sections 17, 19. This arrangement enables the length of the handle section 16 and the length of reinforcement member 18 to be adjusted by sliding the outer sections over the inner sections.

Each side member has a clamping member 20, 22 secured at a lower position. The clamping members 20, 22 are secured to the side members 12, 14 through roller bearings 24, 26. The bearings 24, 26 enable the clamping members 20, 22 to rotate relative to the side members 12, 14.

The side members 12, 14 are also connected by a flexible member 28. The flexible member 28 may be a section of webbing. The webbing 28 has a ratchet mechanism 30 located thereon.

The ratchet mechanism 30 enables the length of the webbing to be adjusted. By using the ratchet mechanism 30 to decrease the length of the webbing 28, the side members 12, 14 and the clamping members 20, 22 are moved towards each other and the lengths of the handle section 16 and the reinforcement member 18 are shortened.

Figures 3, 4:
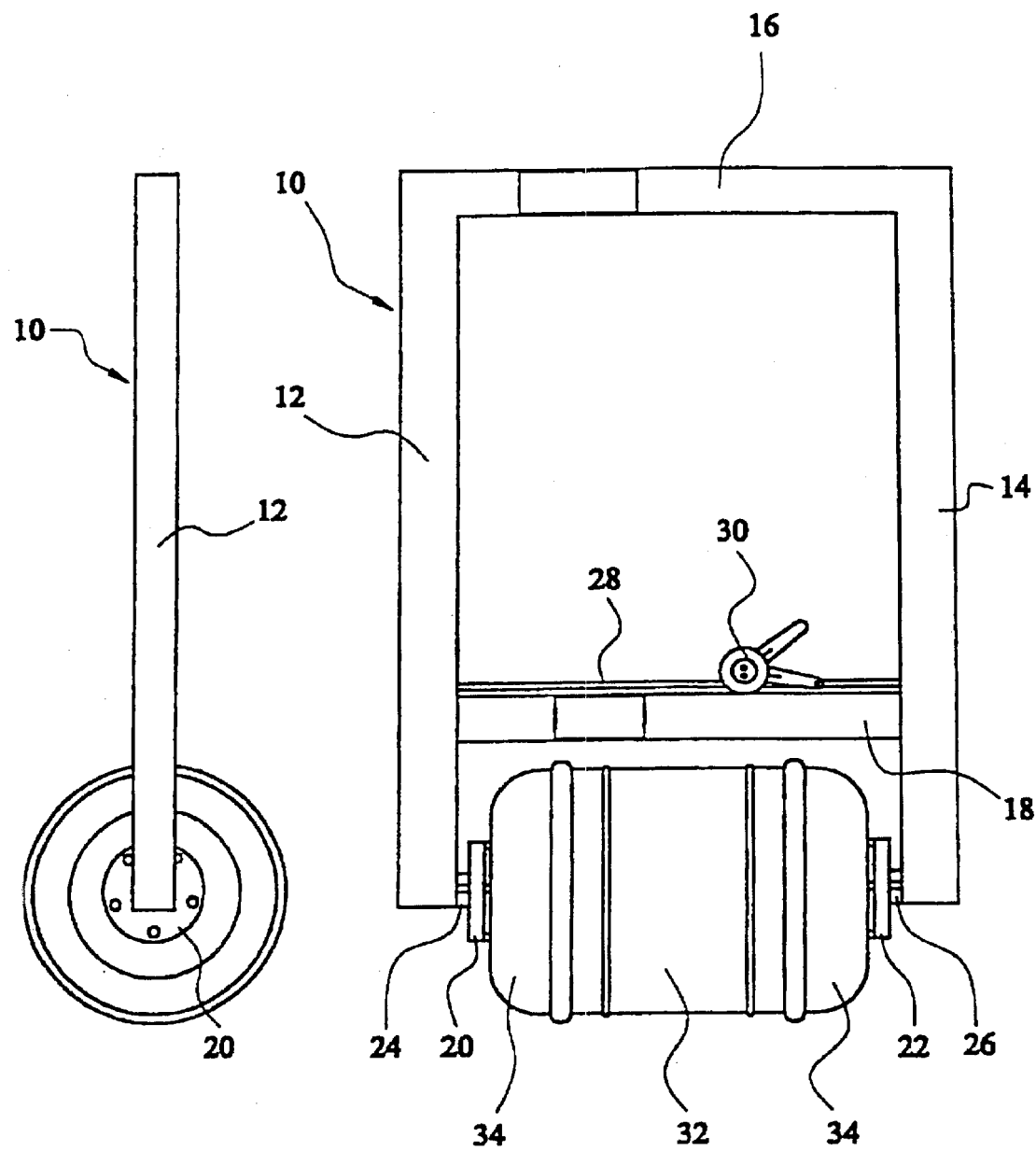
FIG. 3 is a front view of the beer barrel moving apparatus attached to a beer barrel.
FIG. 4 is a side view of the beer barrel moving apparatus affixed to a beer barrel.

As shown in FIGS. 3 and 4 a beer barrel 32 can be clamped between the two clamping members 20, 22. Once the beer barrel 32 is clamped by the clamping members 20, 22, the beer barrel 32 is able to rotate relative to the frame 10 as a result of the roller bearings 24, 26.

The barrel 32 is secured to the frame 10 by firstly spacing the clamping members 20, 22 by a distance greater than the length of the barrel 32. The clamping members are then positioned within the end annular flanges 34 of the barrel. The ratchet mechanism 30 is operated to reduce the length of the webbing 28. The axes of the clamping members 20, 22 are aligned with the central axis of the barrel 32. This subsequently results in a smooth rolling action of the barrel relative to the frame 10.

The reduction of the length of the webbing 28 urges the side members 12, 14 towards each other. This causes the handle section 16 and reinforcement member 18 to subsequently shorten. In addition, the clamping members 20, 22 are urged towards each other until they abut the ends of the barrel 32. The ratchet mechanism 30 is operated further to attempt to shorten the webbing 28 which causes an increase in the pressure of the clamping members 20, 22 on the ends of the barrel. Once the clamping force of the clamping members 20, 22 on the ends of the barrel 32 holds the barrel 32 firmly the operation of the ratchet mechanism can be ceased.

A person can grasp the handle section 16 and move the frame to be at an angle to the ground and the barrel 32. Once at an angle the person can push or pull the frame which thereby causes the barrel 32 to roll along the ground and can then be easily manoeuvred in a controlled manner. The person can move the barrel 32 whilst in an upright stance which thereby reduces any strain placed on their back.

The diameter of a beer barrel 32 is greater that the height of conventional steps. In addition, the diameter of a beer barrel 32 may be greater than twice the height of a step. Therefore, if the barrel 32 needs to be moved up some stairs then the person simply pulls the frame and the barrel to the bottom of the first step. Once at the bottom of the first step the person can pull on the frame 10 to move the barrel 32 up the steps. This is not possible with prior art methods using a trolley with small wheels. In addition, the barrel 32 is always under control and cannot become separated from the frame 10.

If the barrel 32 has not been properly clamped in the frame 10 then the barrel 32 may work loose. Beer barrels have annular flanges 34 located at each end of the barrel. The annular flanges 34 project outwardly from the periphery of the barrel from each end. Therefore, if the clamping members 20, 22 work loose from the surface of the ends of the barrel 32 then they will abut an inner part of the annular flanges 34. Accordingly, the beer barrel 32 does not become separated from the frame 10. This enables the barrel 32 to be re-clamped and the barrel 32 will not have been out of control.

Once at the destination, the barrel 32 is removed from the frame 10. In order to release the barrel 32 from the frame 10 the ratchet mechanism 30 is operated to release its grip on the webbing 28. This enables the clamping members 20, 22 to be moved away from each other until the clamping members 20, 22 are spaced apart by a distance greater than the length of the barrel 32. The frame 10 can then be removed from the barrel 32 and the barrel can be manually handled to an upright position if required.

Figures 5, 6:
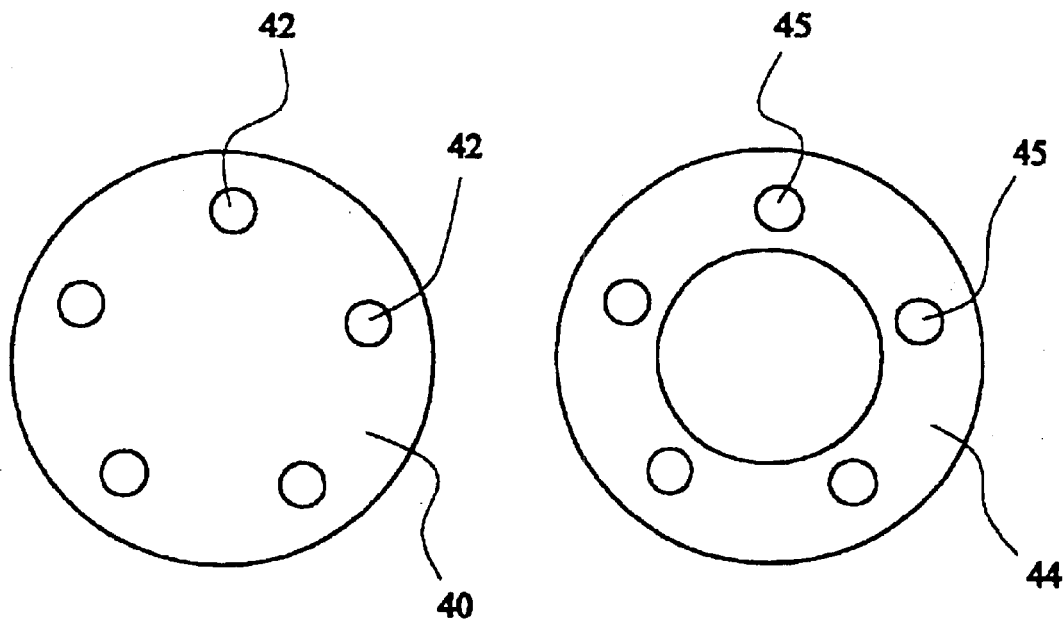
FIG. 5 is a front view of a clamping plate.
FIG. 6 is a front view of an annular reinforcement plate.
Figure 7:
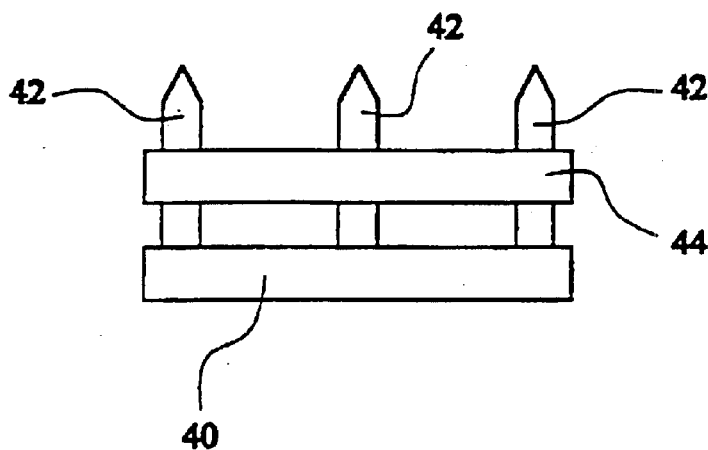
FIG. 7 is a side view of a clamping member.

The clamping members are shown in more detail in FIGS. 5, 6 and 7. Each clamping member has a base plate 40. The base plate 40 is circular shape although a different shape can be used. Each clamping member has a shaft (not shown) affixed centrally on one side of the base plate. Each shaft projects from the base plate 40 and through a roller bearing located on the side members. This enables the base plate 40 and hence the clamping members 20, 22 to rotate relative to the side member 12, 14.

On the other side of the base plate 40 there are projections 42 secured thereto. There may be four or five such projections 42 which are radially positioned on the base plate 40. The projections 42 are lengths of hardened steel and may be welded to the base plate 40. Alternatively, the projections 42 may project through the base plate 40 and be secured by a bolt. However, the welded attachment is preferable since the other side of the base plate will not have any projecting portions and this may reduce the overall width of the frame. It is preferable to keep the overall width of the frame as short as possible in order for the frame to be able to manoeuvre beer barrels through narrow gaps.

The projections have a point at their outermost end. The point may provide a small dimple in the surface of the ends of the barrel 32 when clamped. The small dimple will give an improved grip of the barrel by the frame. However, the projections may be rounded or flat at the end. The shape of the ends of the projections may depend upon the container and/or the material of the container.

Each clamping member has a reinforcement plate 44 that is an annular plate. The annular plate 44 strengthens the arrangement of the projections 42. The annular plate 44 has five apertures 45 located radially to enable the projections 42 to pass therethrough. The annular plate 44 has a central aperture therethrough. This central aperture and the radial arrangement of the projection 42 enables a spear of a beer barrel to be located therein.

The projections on one of the clamping members may be longer that the projections on the other clamping member. This provides a greater distance from the base plate to the surface of the barrel 32 and, enables the clamping member to easily accommodate the spear of a beer barrel.

In order to improve the grip on the beer barrel 32 a layer of a material may be located between the projections and the surface of the beer barrel 32. This may be a layer of a plastics material and may be a rubber material. The shapes of the ends of the projections may be rounded or flat to improve the grip on the container.

Figure 8:
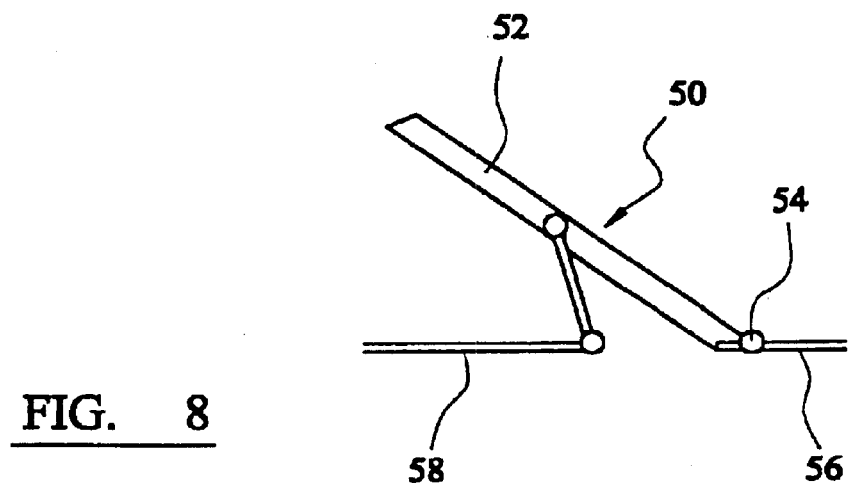
FIG. 8 is a side view of a clamp.

A clamp mechanism 50 may be used as an alternative to the ratchet mechanism 30, as shown in FIG. 8. The clamp 50 has an extending member 52 which is secured to the webbing extending from both side members. The extending member is able to move about a pivot 54 which causes a decrease in the overall length of the webbing. The section of webbing 56 attached to the first side member moves towards the section of webbing 58 attached to the second side member. This causes the first and second clamping members to move towards each other to clamp the container. The clamp can be released to increase the length of the webbing for the container to be removed.

Figure 9:
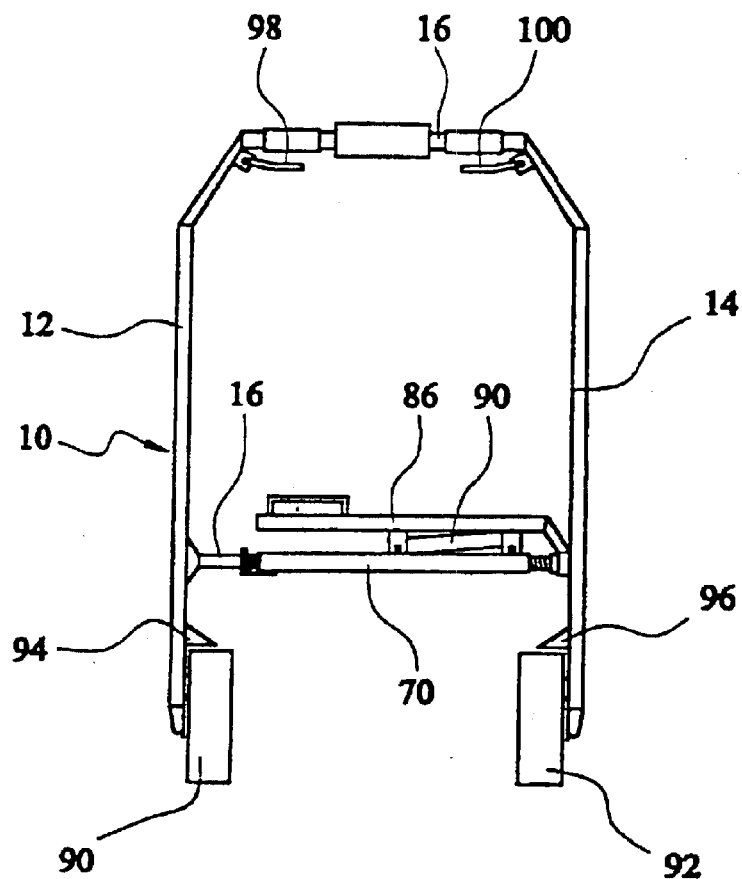
FIG. 9 is a front view of a further embodiment of beer barrel moving apparatus.
Figure 10:
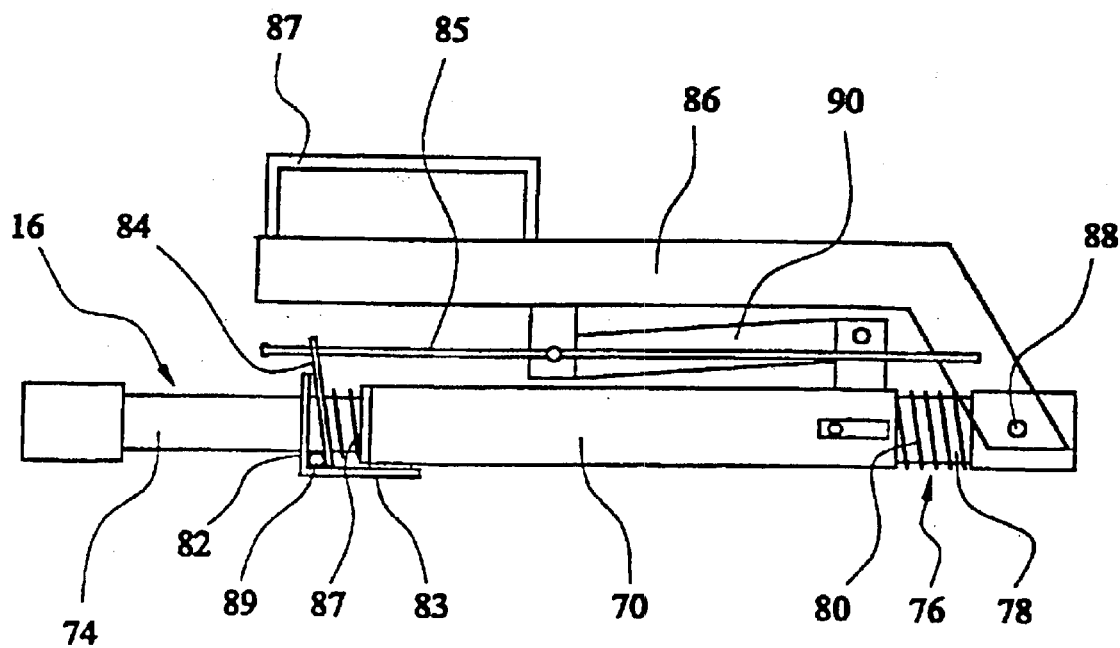
FIG. 10 is a front view of a further embodiment of a clamping mechanism for use with beer barrel moving apparatus.

A further embodiment of beer barrel moving apparatus 10 is shown in FIG. 9 and FIG. 10. The apparatus 10 comprises side members 12 and 14, a handle section 16 and a reinforcement member 18. The reinforcement member 16 is adjustable in length in order to move the side members 12 and, 14 towards and away from each other in order to clamp and release the beer barrel.

The reinforcement member 16 comprises a shaft 70 having two open ends at the longitudinal ends thereof. A first extending member 74 projects from the first side member 12 and is slidably engaged within the shaft 70. Similarly a second extending member 76 projects from the, second side member 14 and is slidably engaged in the other end of the shaft 70. The second extending member 76 comprises a flange 78 about its periphery. A spring 80 locates between the flange 78 and the periphery of the shaft 70 in order to urge the shaft 70 away from the second side member 16.

A second flange member 82 locates around the periphery of the first extending member 74. The second flange member 82 is mounted on a carriage 83 which is connected to the shaft 70. The second flange member 82 acts as a retaining means to retain the first extending member 74 at a fixed position relative to the shaft 70. In order to extend or retract the first extending member 74 relative to the shaft 70 a release level 85 can be moved along its longitudinal axis and held in position in order for the first extending member 74 to slidably move relative to the shaft 70. The second flange member 82 is not integral with the first extending member 74 and can be slidably moved along the longitudinal length of the first extending member 74. This retaining means comprises a plate 84 having an aperture defined therein. The first extending member 74 is able to slide through this aperture when the plate is substantially perpendicular to the first extending member 74. However, the first extending member 74 is retained in position relative to the plate 84 and hence the shaft 70 when the plate is at an angle. A spring 87 coupled with an abutment member 89 urge the plate 84 in to an angled configuration when the release lever is at rest. However, when the release lever is pulled along its longitudinal axis towards the second side member 16 the plate 84 can be positioned to be substantially perpendicular relative to the first extending member 74 and the first extending member can be extended from or retracted into the shaft 70.

This arrangement enables barrels of different lengths to be secured with the beer barrel moving apparatus 10.

In order to clamp a beer barrel in the beer barrel moving apparatus 10 firstly the second flange member 82 is moved along the first extending member 74 in order for the clamping members 90, 92 to lightly grip the ends of the beer barrel. A lever handle 86 which is pivotally connected to the second extending member through a pivot 88 is rotated around the pivot from an open to a closed position. FIG. 9 and FIG. 10 show the level handle in a closed position. The lever handle may comprise a grip portion 87 to aid the user. As the lever handle 86 is pivoted a lever mechanism comprising a lever member 90 moves the shaft 70 along the second extending member 76 towards the second side member 14. As the shaft 70 moves towards the second side member the first extending member 74 and also the first side member 12 are also moved towards the second side member 12, 14. Therefore, the first and second side members 12, 14 and, hence the first and second clamping members 90, 92 are moved relative towards each other. In order to release the beer barrel, the lever handle 86 is rotated in the opposite direction in order for the side members 12, 14 to move away from each other as encouraged by the spring 80.

The clamp members 90, 92 mounted on the side members 12, 14 may comprise resilient members. The resilient members may provide a good grip of the ends of the barrel. The clamp members 90, 92 may comprise rubber discs or rubber annulars which are mounted on cones and preferably plastic cones. In addition, the clamp members 90, 92 may be able to pivot relative to the side members in order for the plane of the clamp members to be in a different plane, for example the plane of the clamp members may not be exactly vertical. For example, the clamp members may be mounted to the side members by 3 dimensional bearings.

Finally, the beer barrel moving apparatus 10 may comprise a brake mechanism. Each clamp member 90, 92 may have a brake shoe 94, 96 associated therewith. Each brake shoe 94, 96 is operated independently by a brake lever 98, 100 mounted on the handle 16. On pulling the brake levers 98, 100 towards the handle 16 the brake shoes 94, 96 are caused to move towards the outer periphery of the clamp members 90, 92 and, eventually, abut the clamp members 90, 92 to inhibit further rotation. The brake mechanism operates using conventional cables. Alternatively, the beer barrel moving apparatus may comprise a single lever operating two brake shoes or a single lever operating a single brake shoe associates with only one clamp member.

The apparatus 10 may be adapted to move other containers especially fluid filled containers, for example gas cylinders, oil drums, chemical drums or plastics containers. The containers may be arranged to contain a volume of a fluid greater than 5 gallons and may be arranged to contain a volume of substantially 9 or 10 or 11 or 18 or 22 gallons of a fluid.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. An apparatus (10) for moving a container (32), the apparatus (10) comprising a frame, the frame comprising:
   a handle section (16);
   first and second side members connected to said handle section;
   a first clamping member (20) and a second clamping member (22) spaced apart from one another and rotatable connected to said first and second side members; and
   ratcheting means (30) for moving said first and second clamping members (20, 22), wherein said first clamping member and second clamping member are adjustable in a transverse direction by said ratcheting means and said first and second clamping members clamp the container therebetween in a clamping engagement such that the container (32) can rotate relative to said frame and the container (32) can be rolled along a surface.

2. The apparatus according to claim 1 wherein the container (32) is substantially cylindrical.

3. The apparatus according to claim 1 in which the container (32) is a fluid filled container.

4. The apparatus according to claim 1 in which the frame is arranged, in use, to be secured to the container (32) such that the container (32) can rotate relative to the frame and the container (32) can be rolled along a surface of the ground.

5. The apparatus according to claim 4 in which the container (32) is rolled along a surface of the ground by manually pulling or pushing said frame by said handle section.

6. The apparatus according to claim 1 in which the frame is arranged to clamp the container (32).

7. The apparatus according to claim 1 in which in the first position said clamping members (20, 22) are spaced apart by a distance greater than the length of the container (32).

8. The apparatus according to claim 1 in which in the second position said clamping members (20, 22) are spaced apart by a distance substantially the same as the length of the container (32).

9. The apparatus according to claim 1 in which the length of the frame is adjustable.

10. The apparatus according to 1 in which the width of the frame is adjustable.

11. The apparatus according to claim 1 in which said first and second side members (12, 14) are connected by a reinforcement member (18).

12. The apparatus according to claim 11 in which the length of the reinforcement member (18) is adjustable.

13. The apparatus according to claim 12 in which the first and second clamping members (20, 22) are secured to the first and second side members (12, 14) through a bearing (24, 26).

14. A method of moving a container (32), the method comprising the steps of removably clamping a frame to a container (32) via a clamping mechanism and a ratcheting mechanism (30), wherein the clamping mechanism includes a first clamping member (20) and a second clamping member (22) spaced apart from one another and rotatably connected to the frame and the ratcheting mechanism (30) moves and adjusts the first and second clamping members (20, 22) in a transverse direction and the first and second clamping members clamp the container therebetween in a clamping engagement such that the container (32) can rotate relative to the frame as the container rolls along a surface.

15. The method according to claim 14 wherein the method comprises pushing the frame.

16. The method according to claim 14 wherein the method comprises pulling the frame.

17. The method according to claim 14 in which the method is a manual method of moving the container (32).

18. The method according to claim 14 in which the method comprises clamping the container (32) in the frame.

19. The method according to claim 18 in which the method comprises clamping the container (32) between first and second clamping members (20, 22).

20. The method according to claim 19 in which the method comprises clamping the ends of the container (10) between the clamping members (20, 22).

21. The method according to claim 20 in which the method comprises moving first and second clamping members (20, 22) between first and second positions to clamp the container (32).

22. A method according to claim 19 in which the method comprises operating a clamping mechanism to move first and second clamping members (20, 22).

23. The method according to claim 14 in which the method comprises operating a ratchet mechanism (30) to move first and second clamping members (20, 22).

\* \* \* \* \*